United States Patent [19]

Henry et al.

[11] Patent Number: 5,495,616
[45] Date of Patent: Feb. 27, 1996

[54] PROCESSOR SYSTEM WITH INTERRUPT DISCRIMINATION

[75] Inventors: Michael D. Henry, Southampton; David Leaver, Hassocks, both of Great Britain; Neil Wright-Boulton, Ayrshire; Mark W. Hare, Renfrewshire, both of Scotland; Frederick Jackson, Glasgow, Great Britain

[73] Assignee: International Business Machines Corporation, Armonk, N.Y.

[21] Appl. No.: 259,422

[22] Filed: Jun. 14, 1994

[30] Foreign Application Priority Data

Jun. 15, 1993 [GB] United Kingdom ............... 9312272

[51] Int. Cl.⁶ .................... G06F 13/10; G06F 13/24
[52] U.S. Cl. ................ 395/741; 395/733; 395/868
[58] Field of Search .................... 395/725, 275

[56] References Cited

U.S. PATENT DOCUMENTS 4,768,149  8/1988  Konopik et al. ............... 395/725
5,265,255  11/1993  Bonevento et al. ............. 395/725

FOREIGN PATENT DOCUMENTS

0434267A2  12/1990  European Pat. Off. ........ G06F 13/24

*Primary Examiner*—Jack B. Harvey
*Assistant Examiner*—Jeffrey K. Seto
*Attorney, Agent, or Firm*—Anthony N. Magistrale; Richard A. Tomlin

[57] ABSTRACT

An interrupt-driven processor system comprising a processor connected via a plurality of processor input and output lines to a keypad or keyboard. Actuation of one of the keys of the keypad or keyboard generates an interrupt signal on one of the input lines which invokes an interrupt service routine in the processor. A secondary interrupt source can be attached via an interrupt line to each of the input lines with the interrupt service routine being designed to discriminate between an interrupt signal generated by actuation of a key and an interrupt signal generated by a secondary source. Using this technique, further interrupts can be added to an off-the-shelf processor including keypad interrupts without the need for additional interrupt controlling hardware. Furthermore, a custom-built microprocessor can be designed with fewer interrupt pins.

2 Claims, 2 Drawing Sheets

PROCESSOR SYSTEM WITH INTERRUPT DISCRIMINATION

TECHNICAL FIELD OF THE INVENTION

The present invention relates to an interrupt driven processor system comprising a processor connected to a key based input apparatus.

Background of the Invention

A large variety of different types of microprocessors (hereinafter 'processor') are now available off the shelf from companies such as Motorola for use as 'building blocks' in the design of more complex microprocessor based systems. These off the shelf processors are generally designed to handle a fixed and unalterable number of hardware interrupts from attached peripheral devices, the fixed number being set by the number of interrupt pins on the microprocessor package. Accordingly, the provision of additional interrupts to such a microprocessor will usually involve the design of specific hardware solutions thus resulting in extra complexity and cost.

With custom built processors, the problem of providing additional interrupts does not usually arise as the processor will be designed from the outset to handle the required number of interrupts and to include the appropriate number of interrupt pins. However, the cost and physical size of processors increases with an increase in the number of pins and it is thus usually desirable to keep the required number of pins to a minimum. As with off the shelf processors, once the number of interrupts has been fixed for a purpose built processor it is not a simple matter to provide additional interrupts.

Both off-the-shelf and custom built microprocessors commonly include keypad interrupts for receiving interrupt requests generated on actuation of the keys of an attached keypad or keyboard. Examples of off-the-shelf processors which provide this facility are the Motorola 68HC05G9 and 68HC05G10 Microcontroller Units.

For off the shelf processors, it would be desirable to allow an increase in the number of interrupts handled by the processor without the need for specific interrupt handling hardware. For custom built processors, it would be desirable to allow the design engineer the freedom to provide a processor package providing the required interrupt handling function but with a reduced number of pins.

Summary of the Invention

It is therefore an aim of the present invention to provide a mechanism for increasing the number of available hardware interrupts in microprocessors having keypad interrupts.

Accordingly, the present invention provides an interrupt-driven processor system comprising a processor and operator input means. The input means comprises a matrix of input keys connected along a first matrix dimension to the processor via a plurality of processor input lines and connected along second matrix dimension to the processor via a plurality of processor output lines, whereby actuation of one of the keys of the matrix causes generation of an interrupt signal on the processor input line to which that key is connected. The system further comprises interrupt servicing means for determining the identity of the actuated key, the system being characterised in that a secondary interrupt source is connected via an interrupt line to at least one of the input lines. The interrupt servicing means includes discrimination means for discriminating between key generated interrupts and interrupt source generated interrupts received at the processor on said one input line.

Thus by employing a system in accordance with the present invention, further interrupt sources can be added to a processor simply by connecting each further source to an existing input line. The interrupt servicing means which preferably takes the form of a software routine resident in the processor is designed to discriminate between those interrupt signals generated by key actuation and those signals generated by the further interrupt sources.

Although a number of discrimination techniques can be devised, one preferred technique takes advantage of the fact that interrupt signal pulses caused by operator action e.g., depression of a key on a keypad or keyboard, are often of a relatively large duration compared with other interrupt signal pulses. On receipt of the interrupt signal, the interrupt servicing routine introduces a delay of predetermined duration before checking the state of each of the input lines. The delay is set such that when the state of the input lines is checked, an interrupt signal pulse generated by a secondary source will have finished and the input line will have reverted to its pre-interrupt state.

In a preferred system, the input lines are held high in their pre-interrupt state and an interrupt on one of the input lines causes the line to go low. The identity of an interrupted line is preferably stored in a status register in the processor for subsequent use in either identifying the particular key which was depressed or the identity of the particular secondary source.

In a preferred system, a diode is provided on each output line to isolate the secondary interrupt source from the input means and a diode is provided on each interrupt line in order to isolate the input means from the non-interrupt generating activity of each secondary interrupt source.

A preferred embodiment of the invention will now be described, by way of example only, with reference to the accompanying drawings.

DETAILED DESCRIPTION OF THE INVENTION

Figure 1:
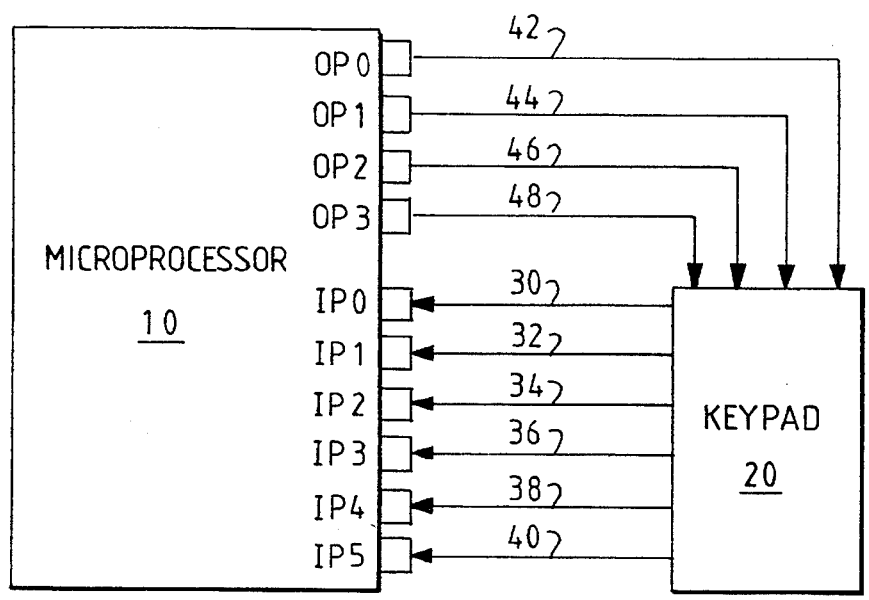
FIG. 1 is a block diagram of a microprocessor and attached keypad.

With reference to FIG. 1, a processor system is shown which comprises microprocessor 10 connected to keypad 20. The keypad includes a six by four matrix of keys connected via six input lines 30,32,34,36,38,40 to six microprocessor pins (IP0 to IP5) and via four output lines 42,44, 46,48 to four microprocessor output pins (OP0 to OP3). As will be described hereinafter, depression of one of the keys causes an interrupt signal on one of the six input lines which results in the issuing of a keypad interrupt request signal to the Central Processing Unit (CPU) of the microprocessor.

Figure 2:
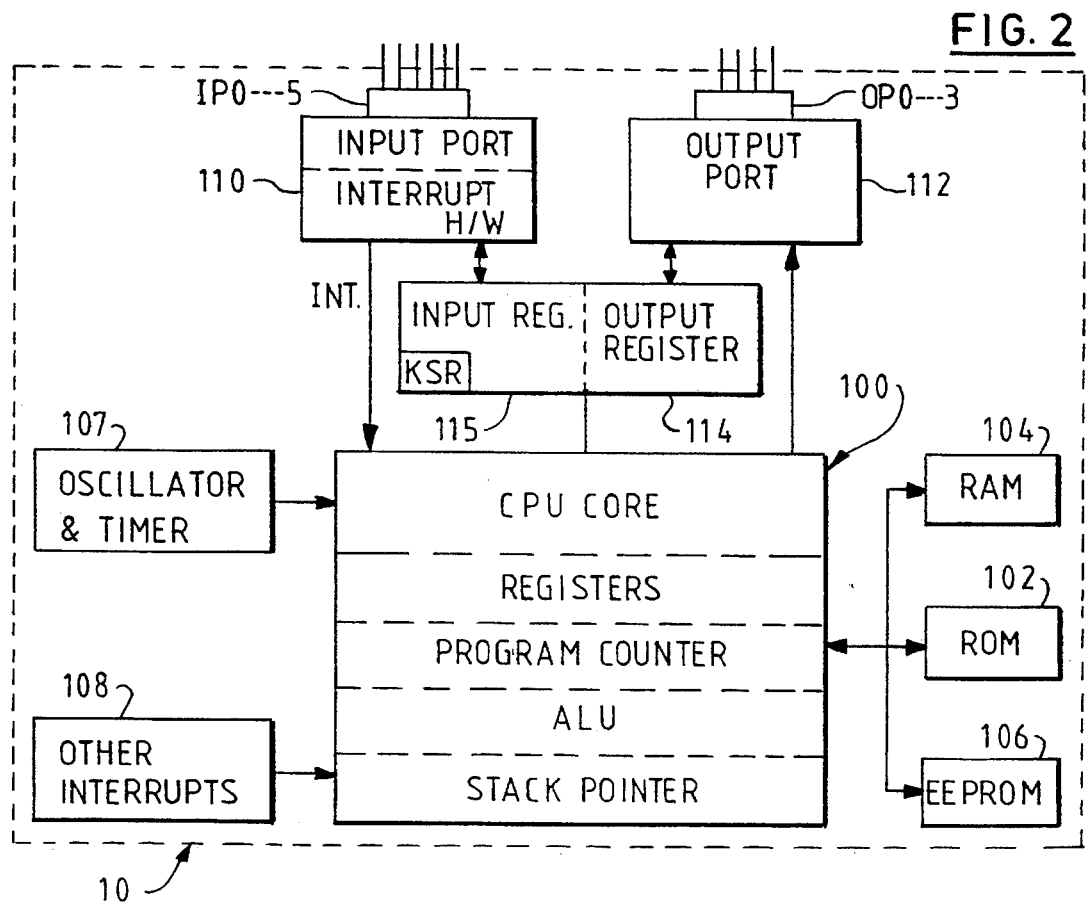
FIG. 2 is a block diagram of the major functional elements of the microprocessor of FIG. 1.

FIG. 2 shows the major functional elements of microprocessor 10. At the heart of the microprocessor is the CPU 100 which includes an ALU, a program counter, a stack pointer and various internal registers. The CPU operates under the control of program(s) stored in ROM 102. Internal processor memory is provided in the form of RAM 104 and EEPROM 106. Oscillator and core timer unit 107 generates control and timing signals for routing to appropriate components of the microprocessor in order to control operation of the microprocessor.

Respectively connected to input pins IP0–1P5 and output pins OP0–OP3 are input port logic 110, including keypad interrupt hardware, and output port logic 112. Associated with the input and output ports are Input and Output Registers 114. The Input Registers include Keypad Status Register (KSR) 115 which, when set, identifies the input line over which an interrupt signal was received. CPU 100 has access to the I/O Registers and in particular to the Keypad Status Register. The processor 10 is also designed to handle sources of interrupts other than those received via the processor input pins. These further interrupt sources are indicated generally at 108.

Figure 3:
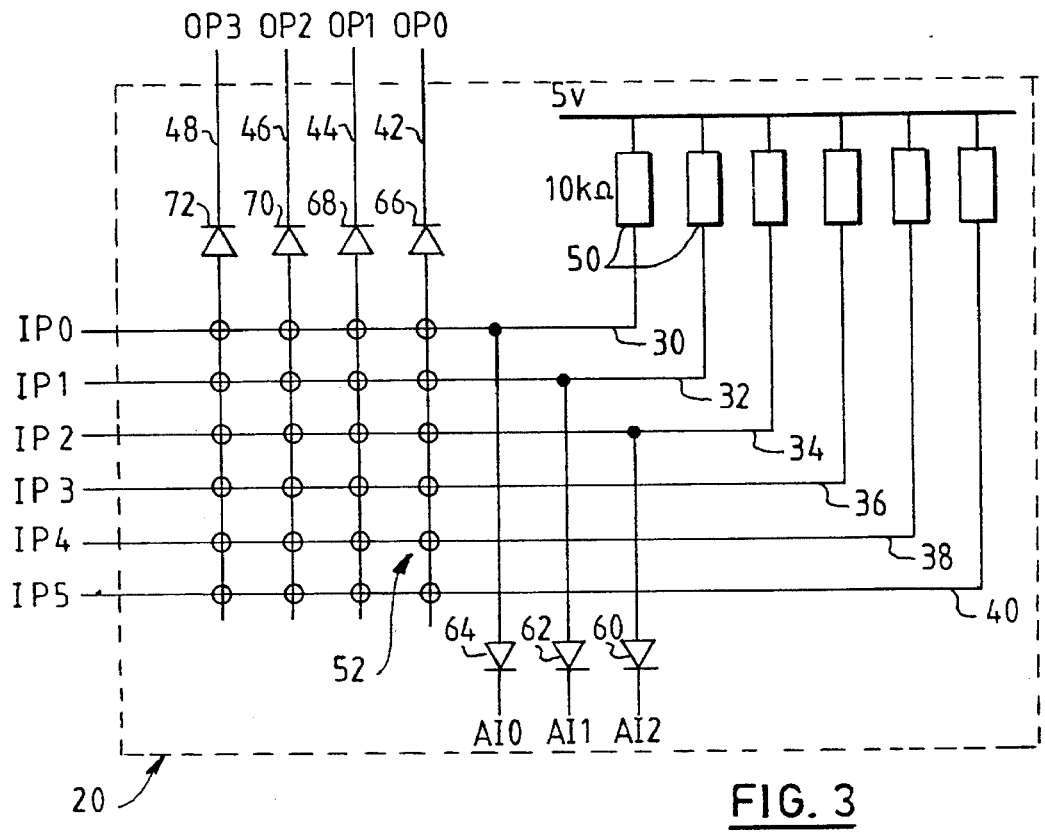
FIG. 3 shows the keypad circuitry including additional interrupt lines.

FIG. 3 shows, in simplified form, the circuitry of keypad 20 including the six input and four output lines of FIG. 1. At each crossing point of input and output lines is a key and depression of a key causes contact to be made between input and output lines at the crossing point. For example, depression of key 52 connects input line 38 with output line 42. Provided on each input line is a ten Kohm resistor connected to 5 Volt supply which when the keypad is in quiescent state causes all input lines to be pulled high.

In accordance with the invention, FIG. 3 further shows three additional interrupt lines AI0, AI1, AI2, connecting with input lines 30, 32, & 34. It should be appreciated however that in the FIG. 3 embodiment, an additional interrupt line can be provided for each of the input lines thus allowing the attachment of six further interrupt sources. Diodes 60, 62 & 64 are provided, one on each of these additional interrupt lines, which serve to isolate the keypad circuitry from the non-interrupt generating activities of the additional interrupt circuitry. Similarly diodes 66,68,70 & 72 are also provided, one on each of the output lines, which serve to isolate the additional interrupt circuitry from normal operation of the keypad.

When the keypad circuitry and connected additional interrupt circuitry are in quiescent state, all input lines are held high by the pull-up resistors. In addition, all output lines are held low by output logic 112. When either (i) a key is depressed or (ii) an interrupt pulse is generated on one of the additional interrupt lines, the relevant input line undergoes a transition from high to low. The additional interrupt circuitry is arranged to generate pulses of relatively short duration, e.g., a few milliseconds, after which period the input line returns high. In contrast, the actuation of a key will cause the input line to stay low until the key is released. The duration of a typical key actuation will be measurably longer than the duration of an interrupt pulse generated by the interrupt circuitry.

A transition from high to low on one of the input lines, caused either by actuation of a key or by the additional interrupt circuitry, is sensed by the keypad interrupt logic in input hardware 110. The keypad status flag in Keypad Status Register is set for the activated input line and a keypad interrupt request is issued by the interrupt logic to the CPU. In response to the Keypad Interrupt Request, hardware in the CPU causes a jump to a preset memory location which specifies the interrupt service software routine. In accordance with one embodiment of the invention, the interrupt service routine operates to discriminate between those interrupt signals generated by depression of a key and those generated by the additional interrupt circuitry. Furthermore, the routine identifies which of the keys was depressed.

A preferred mode of operation of the Interrupt Service Routine will now be described with reference to the flow diagram shown in FIG. 4. After invocation of the routine, a delay is introduced at 200 which has a duration set to be greater than the period of an interrupt pulse on one of the additional interrupt lines. Introduction of a delay in this manner ensures that if the interrupt signal was due to the additional circuitry, then the input line will have returned high. After expiry of the delay period, the six input lines are checked at 210 to determine if they are all high. If yes, then it means that an interrupt was generated on one of the additional lines. The keypad interrupt flag in Input register 115 is checked at 230 to determine which of the six input lines was interrupted and a interrupt handling subroutine appropriate to that particular additional interrupt is invoked.

If one of the input lines is still low then this means that one of the keys is still being depressed. The software then jumps to an interrogation subroutine 250 to determine which of the keys was depressed. As is known, during the interrogation routine, signals are supplied to output lines and the resultant input line states are scanned. The exact manner in which this identification is achieved does not form a part of the present invention but the operation typically involves application of interrogation signals which hold each of the output lines low in turn. The response on the input lines indicates which of the keys in the row of keys was depressed.

Figure 4:
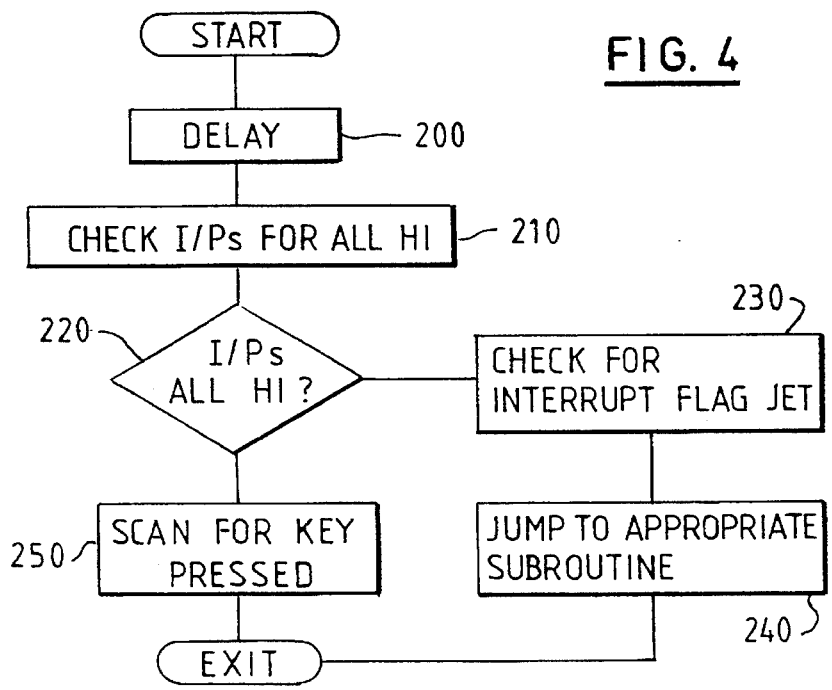
FIG. 4 is a flow diagram indicating the steps of the interrupt service routine.

Although not indicated as a step in the FIG. 4 flow diagram, the interrupt service routine can be adapted to discriminate between a keypad interrupt request and an interrupt request received from a different interrupt source indicated at 108 in FIG. 2. Such discrimination capability is required when the same interrupt vector address is shared between the keypad and the other interrupt source. In this case, the interrupt service routine determines that the interrupt request was received from the keypad by checking the keypad status register.

Although the interrupt service routine of the above-described embodiment relies on a difference in duration between key actuated and additional interrupt pulses in order to discriminate between the two, the applicability of the invention is not to be limited to such systems.

Alternative discrimination mechanisms are envisaged which are appropriate to processor systems in which the interrupt pulses are of similar duration. For example the required discrimination could be achieved during the interrogation and scanning operations. In this case, if the interrupt were key generated, then the status of the input lines would be dependent on the interrogation signals applied to the output lines. It will be appreciated that if the interrupt were not key generated, then there would be no connection between output and input lines. Therefore, the state of the input lines would be independent of the interrogation signals applied to the output lines.

While the invention has been particularly shown and described with reference to a preferred embodiment, it will be understood by those skilled in the art that various changes in form and detail may be made therein without departing from the spirit and scope of the invention.

What is claimed is:

1. An interrupt-driven processor system comprising a processor and operator input means, the input means comprising a matrix of input keys connected along a first matrix dimension to the processor via a plurality of processor input lines and connected along second matrix dimension to the processor via a plurality of processor output lines, whereby actuation of one of the keys of the matrix causes generation of an interrupt signal on the processor input line to which that key is connected, the system further comprising interrupt servicing means for determining the identity of the actuated key, the system including a secondary interrupt source is connected via an interrupt line to at least one of the input lines, the interrupt servicing means including discrimination means for discriminating between key generated interrupts and interrupt source generated interrupts received at the processor on said one input line; and, wherein an interrupt signal pulse generated by a secondary source has a shorter duration than an interrupt signal pulse generated by actuation of a key, the discrimination means checking the state of each of the input lines a predetermined time after receipt of an interrupt signal at the processor, said predetermined time being greater than the duration of a secondary source interrupt pulse but smaller than the duration of a key interrupt pulse, whereby if after the predetermined time each input line is at its pre-interrupt state then a secondary source is thereby identified as the source of the interrupt signal.

2. An interrupt-driven processor system comprising a processor and operator input means, the input means comprising a matrix of input keys connected along a first matrix dimension to the processor via a plurality of processor input lines and connected along second matrix dimension to the processor via a plurality of processor output lines, whereby actuation of one of the keys of the matrix causes generation of an interrupt signal on the processor input line to which that key is connected, the system further comprising interrupt servicing means for determining the identity of the actuated key, the system including a secondary interrupt source connected via an interrupt line to at least one of the input lines, the interrupt servicing means including discrimination means for discriminating between key generated interrupts and interrupt source generated interrupts received at the processor on said one input line;the system further comprising a plurality of secondary interrupt sources, with one secondary source connected via an interrupt line to each of said plurality of input lines, and wherein an interrupt signal pulse generated by the secondary source has a shorter duration than an interrupt signal pulse generated by actuation of a key, the discrimination means checking the state of each of the input lines a predetermined time after receipt of an interrupt signal at the processor, said predetermined time being greater than the duration of a secondary source interrupt pulse but smaller than the duration of a key interrupt pulse, whereby if after the predetermined time each input line is at its pre-interrupt state then the secondary source is thereby identified as the source of the interrupt signal.

* * * * *